March 14, 1961
W. HAHN
2,974,576
ARRANGEMENT FOR THE SETTING OF THE
APERTURE OF A LENS OF A CAMERA
Filed June 19, 1956
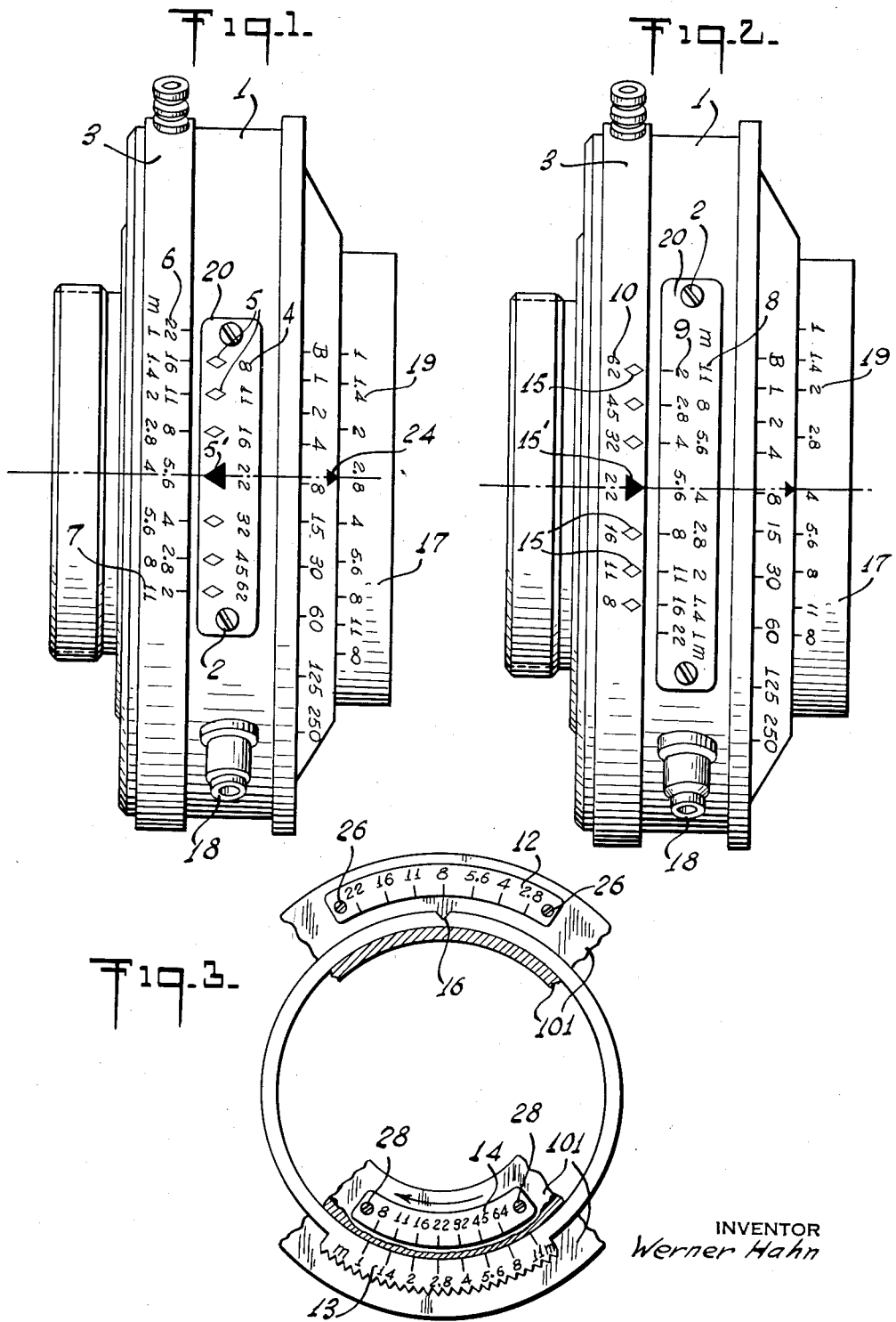
INVENTOR
Werner Hahn

United States Patent Office 2,974,576
Patented Mar. 14, 1961

2,974,576

ARRANGEMENT FOR THE SETTING OF THE APERTURE OF A LENS OF A CAMERA

Werner Hahn, Dresden, Germany, assignor to VEB Kamera- und Kinowerke Dresden

Filed June 19, 1956, Ser. No. 592,345

Claims priority, application Germany Oct. 11, 1955

6 Claims. (Cl. 95—64)

This invention relates to a setting arrangement for setting the aperture of the objective lens of a camera having a linear aperture scale, and more particularly to a setting arrangement for setting the aperture of the lens in dependence on the distance of the object to be taken by a flash light exposure with a flash light having a predetermined guide number.

It is known that for the setting of the proper relation between the aperture of a lens and the distance of the object from the source of light for flash light exposures the constant of the flash light guide number, i.e. the product of distance and aperture, must be considered. Therefore, always the quotient resulting from the division of the flash light guide number by a chosen factor of the above mentioned product must be determined when a flash light having a predetermined flash light guide number is used. Hitherto complicated or at least time consuming calculating operations must be carried out to find the necessary quotient for setting the aperture of the lens accordingly. Errors in calculations are likely to occur.

An object of the invention is to provide a setting arrangement for cameras, by means of which the aperture of the lens may be readily set in dependence on the distance of the object to be taken by a flash light exposure with a flash light having a predetermined guide number, without the necessity of carrying out any calculating operation.

A further object of the invention is to provide a setting arrangement of above described kind which—besides the automatic setting of the aperture of the lens—permits the reading off of the set value of the aperture.

Another object of the invention is to provide a setting arrangement of above described kind which may be readily manipulated.

Other objects and structural details of the invention will be apparent from the following description when read in conjunction with the accompanying drawings forming part of the specification, wherein:

Fig. 1 is a side elevational view of a barrel containing the objective, diaphragm and shutter of a camera, provided with a setting arrangement according to the invention;

Fig. 2 is a side elevational view of a similar barrel provided, however, with a different embodiment of a setting arrangement according to the invention, and Fig. 3 is a fragmentary front elevational view, partly in section, of another embodiment of a barrel containing the objective, diaphragm and shutter of a camera, provided with still another embodiment of a setting arrangement according to the invention.

Referring now to Fig. 1, which illustrates separately an ordinary camera lens assembly provided with rotary aperture and distance setting mechanisms and a shutter, the numeral 3 designates a setting ring 3 for setting the aperture or opening of the lens of a camera rotatably mounted on the diaphragm support 1. Said rotatable setting ring 3 is provided with a linear aperture or stop scale 6 and a distance scale 7 arranged next to each other. Said two scales 6 and 7 have the same graduation. The numerical values indicated by said two scales 6 and 7 increase in opposite directions, i.e. for example as shown in Fig. 1, the values of the aperture scale 6 increase from right to left while the values of the distance scale 7 increase from the left to the right. Increasing numerical values of the linear aperture scale 6 correspond to a decrease in the size of the aperture of the lens to be set by the setting ring 3.

A plate 20 carrying a scale 4 indicating values of flash light guide numbers is secured to the stationary portion of the diaphragm support 1 by screws. Said guide number scale 4 has the same graduation as the aperture scale 6 and the distance scale 7.

All of said scales 4, 6 and 7 are logarithmic to the same base of the respective functions they indicate, and thus they also represent geometric progressions having the same common ratio.

The plate 20 is also provided with a row of marks 5, 5', each of said marks being opposite to a value of the guide number scale 4. The center mark 5' of said row of marks 5, 5' being of a shape (triangular) different from that of the other marks may also be used as a mark for reading off the setting of the aperture or for setting the aperture for a certain value.

The scales 4, 6 and 7 are arranged in such a manner that the value of the aperture scale 6 to be read off opposite the setting mark 5' represents the quotient resulting from a division of a guide number of the scale 4 by the value of the distance scale 7 which may be found opposite to the respective guide number. Thus, for example, according to the setting of the setting ring 3 shown in Fig. 1, the value of the aperture opposite to the setting mark 5' is 5.6. Said value 5.6 is the quotient obtained by dividing the guide number 8 by 1.4 or the guide number 22 by 4 or the guide number 45 by 8, etc.

Of course a separate mark could be arranged on the stationary portion of the diaphragm support 1 for cooperation with the aperture scale 6. However, the arrangement is simplified by the use of the mark 5' of the row of marks 5, 5' as described above and shown in Fig. 1.

Preferably, the guide number scale 4 and the distance scale 7 are made in the same color so as to facilitate the reading off.

The operation of the setting arrangement is as follows:

Upon connection of a flash light, for example of the guide number 16, by means of an electric cable of known qualities through the nipple 18 with the synchronized shutter, the objective is set according to the distance of the object to be taken, for example a distance of 2.8 meters, by means of a rotation of the distance ring 17 rotatably arranged in the diaphragm support 1. Said distance ring 17 is provided with a further distance scale 19 cooperating with a stationary indicating mark 24. Like the distance scale 7, said further distance scale 19 represents a geometric progression. Thereafter, the rotatable aperture setting ring 3 is brought into a position wherein the value of the set distance, i.e. for example as mentioned above the value 2.8, is in register with the guide number of the flash light, i.e. for example as mentioned above the number 16. This position is shown in Fig. 1. Thus, the aperture of the lens has been automatically set for the necessary value, which amounts to 16 divided by 2.8 equal to 5.6. Said value 5.6 may be readily read off from the device, as the mark 5' is in register with the value 5.6 of the aperture scale 6.

According to above described embodiment shown in Fig. 1 the aperture scale 6 and the distance scale 7 are arranged on the rotatable aperture setting ring 3, while the guide number scale 4 is arranged on the stationary diaphragm support 1.

According to the embodiment shown in Fig. 2, however, the guide number scale 10 and the row of marks 15, 15' are arranged on the aperture setting ring 3 rotatably mounted on the diaphragm support 1. The stationary plate 20 attached to the diaphragm support 1 by screws 2 is provided with the aperture scale 9 and the distance scale 8. Otherwise, the arrangement of the scales and their construction correspond entirely to that described above in connection with Fig. 1.

The operation of the device shown in Fig. 2 corresponds to the operation of the device shown in Fig. 1. For example, according to Fig. 2 the distance ring 17 is set for a distance of 4 meters. Then, the aperture setting ring 3 is brought into a position wherein the guide number of the flash light to be used, for example the guide number 22, is opposite the value 4 of the distance scale 8. Thus, the aperture is automatically set for the proper value, which according to the position shown in Fig. 2 is 5.6, i.e. the value in register with the mark 15'.

According to the embodiment shown in Fig. 3, the aperture setting ring 11 rotatably mounted on the diaphragm support 101 is provided with a distance scale 13 at one of its sides and an indicator notch 16 at its other side. Said notch 16 is arranged for cooperation with a stationary aperture scale 12 rigidly connected with the barrel 101 by screws 26. Furthermore, a stationary guide number scale 14 secured to the diaphragm support 101 by screws 28 is arranged opposite the rotatable distance scale 13. It will be readily understood that according to the embodiment shown in Fig. 3, the aperture scale 12 and the distance scale 13 are arranged on separate parts remote from each other and movable with respect to each other. Otherwise, the arrangement of the scales and their construction corresponds to that described above in connection with Fig. 1.

The operation of the device shown in Fig. 3 is as follows: The distance ring (not shown) is set for a certain distance, for example 2 meters. Then, the aperture setting ring 11 is brought into a position wherein the value 2 of its distance scale is opposite to the guide number, for example 16, of the flash light to be used. Thus, the aperture of the lens is automatically set for the proper value, which according to the position of the indicator notch 16 in Fig. 3 amounts to 8.

As will be readily understood, the quotient resulting from the division of the value of the guide number by the value of the aperture being opposite to the respective guide number is represented by the value on the scale 12 in register with the indicator notch of the settable aperture setting ring 11. For example 8 divided by 1 equals to 8, 11 divided by 1.4 equals to 8, or 16 divided by 2 equals to 8, etc.

I have described preferred embodiments of my invention, but it is understood that this disclosure is for the purpose of illustration, and that various changes in shape and proportion, as well as the substitution of equivalent elements for those herein shown and described may be made without departing from the spirit and scope of the invention set forth in the appended claims.

What I claim is:

1. A setting device for setting the diaphragm of a photographic camera lens having diaphragm setting means movable with respect to diaphragm support means for controlling the aperture of said lens; said device comprising first scale means longitudinally calibrated in units of distance for indicating thereon the distance value between the object to be photographed and a source of light; and second scale means longitudinally calibrated in units of flash bulb guide number values, one of said scale means being fixedly attached on said diaphragm support means, and the other one of said scale means being operatively connected to said diaphragm setting means for coordinated longitudinal movement with the latter parallel to and adjacent said one scale means, wherein juxtaposition of calibrations on said scale means is used to define the position of the diaphragm setting means, both of said scale means being calibrated logarithmically in values of logarithms to the same base, said values increasing along said first and second scale means in the same direction, the base of said logarithms being determined in such a manner, that the quotient of every distance value on said first scale means divided into the adjacent guide number value on said second scale means is the aperture value of said diaphragm setting in predeterminated units, said quotient being contant for any setting of said diaphragm setting means relative to said diaphragm support means.

2. A setting device as set forth in claim 1, including third scale means longitudinally calibrated in units of aperture value for reading said diaphragm setting on said third scale, indicator means arranged adjacent said third scale means, one of said third scale means and said indicator means being attached on said diaphragm support means, and the other one of said third scale means and said indicator means being operatively connected to said diaphragm setting means for coordinated movement therewith.

3. A device as set forth in claim 2, said diaphragm setting means comprising setting ring means rotatably mounted on said diaphragm support means, said first and said third scale means being mounted on said setting ring means, said second scale means being mounted on said diaphragm support means.

4. A device as set forth in claim 2, said diaphragm setting means comprising setting ring means rotatably mounted on said diaphragm support means, said first and said third scale means being mounted on said diaphragm support means and said second scale means being mounted on said setting ring means.

5. A device as set forth in claim 2, said diaphragm setting means comprising setting ring means rotatably mounted on said diaphragm support means, said first scale means and said indicating means being attached on said setting ring means, and said second and third scale means being mounted on said diaphragm support means.

6. In an objective assembly of a photographic camera lens having a stationary support, a distance adjustment ring rotatable with respect to said support for adjusting said objective assembly for a particular distance, an aperture control ring rotatable with respect to said assembly for adjusting the lens opening of said objective assembly, a first scale longitudinally calibrated in units of distance for indicating thereon the distance value between an object to be photographed and a light source, a second scale longitudinally calibrated in lens aperture values, a third scale calibrated in flash bulb guide values, said first and said third scales being calibrated logarithmically in values of logarithms to the same base, said values increasing along said first and said third scale means in the same direction, the base of said logarithms being determined in such a manner that the quotient of every distance value on said first scale means divided into the adjacent guide number value on said third scale means defines the aperture value of said diaphragm setting in predetermined units, said first and said third scales being mounted upon said support and said aperture control ring for movement with respect to one another, said first scale and said third scale being disposed in a spatial relationship in which juxtaposition of the calibration on said first scale with a selected one of calibrations on said second scale determines the position of the said aperture control ring, said second scale being mounted in fixed relation with one of the other of said scales, whereby the relative position of said second scale to the remaining scales is uniquely indicative of the lens opening.

(References on following page)

References Cited in the file of this patent

UNITED STATES PATENTS

| | | |
|---|---|---|
| 871,654 | Watkins et al. | Nov. 19, 1907 |
| 2,213,749 | Strauss | Sept. 3, 1940 |
| 2,334,075 | Davenport | Nov. 9, 1943 |
| 2,671,614 | Schwartz et al. | Mar. 9, 1954 |

FOREIGN PATENTS

| | | |
|---|---|---|
| 440,299 | France | May 1, 1912 |
| 1,014,063 | France | May 21, 1952 |

OTHER REFERENCES

"An Automatic Flash Exposure Calculator," an article by Willis Ware, in *The Camera Magazine*, September 1951, pages 108, 109, 114.